P. D. THROPP.
VEHICLE TIRE.
APPLICATION FILED JUNE 9, 1913.

1,217,665.

Patented Feb. 27, 1917.

Witnesses
Hyperion Barry.
H. George Barry

Inventor:
Peter D. Thropp
by his attorneys
Brown & Seward

UNITED STATES PATENT OFFICE.

PETER D. THROPP, OF TRENTON, NEW JERSEY, ASSIGNOR TO THE DE LASKI AND THROPP CIRCULAR WOVEN TIRE COMPANY, OF TRENTON, NEW JERSEY, A CORPORATION OF NEW JERSEY.

VEHICLE-TIRE.

1,217,665.     Specification of Letters Patent.     Patented Feb. 27, 1917.

Application filed June 9, 1913. Serial No. 772,611.

*To all whom it may concern:*

Be it known that I, PETER D. THROPP, a citizen of the United States, and resident of Trenton, in the county of Mercer and State of New Jersey, have invented a new and useful Improvement in Vehicle-Tires, of which the following is a specification.

This invention relates to vehicle tires with the object of providing a tire of this character which will have the beneficial qualities of the so-called cushion tire and the so-called pneumatic tire combined.

Another object is to provide a tire of this character which will have its component parts arranged in a novel manner for securing strength and resiliency.

A further object is to provide a method of making such a tire by an open cure process and more particularly by a wrapped tread process, and still more particularly by an open single cure wrapped tread process.

A still further object is to provide a method for making such a tire whereby it may be vulcanized as above mentioned, and at the same time vulcanized directly on its wheel rim, while the tire and rim are held in the mold.

Still further objects are to provide certain improvements in the form, construction and arrangement of the several parts whereby the above mentioned objects may be effectively carried out.

Figure 1:
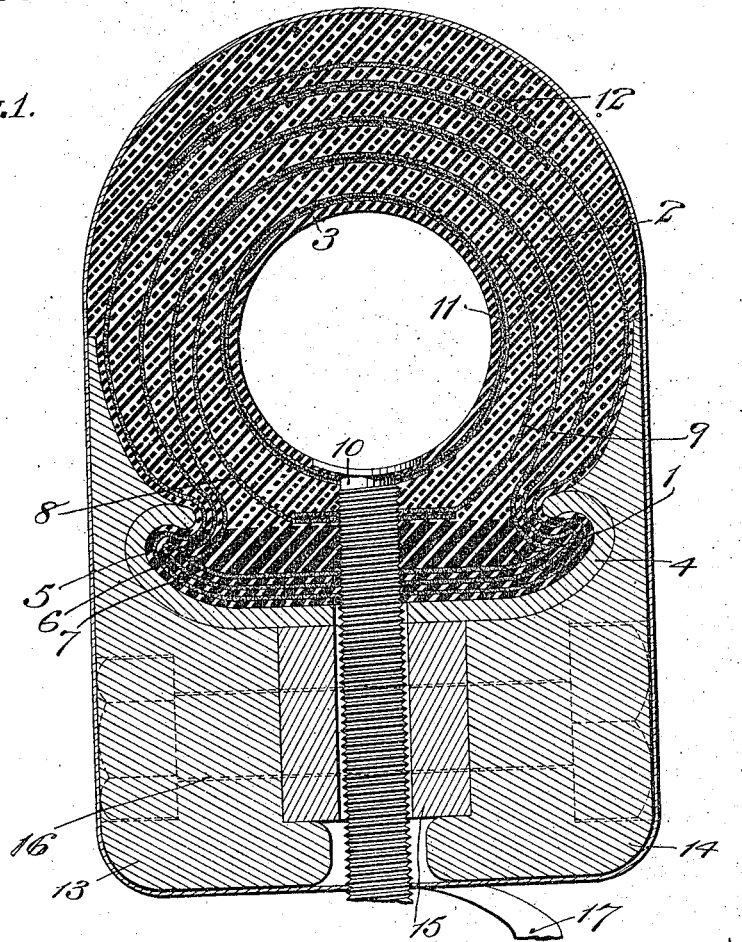
Figure 2:
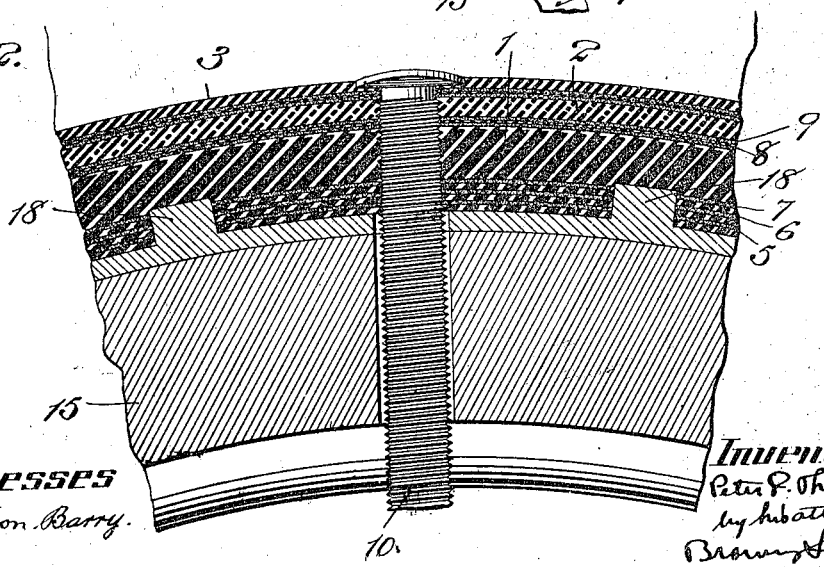

A practical embodiment of the invention is represented in the accompanying drawings, in which, Figure 1 represents a transverse section of the completed tire in its mold, and Fig. 2 represents a detail section taken at right angles to the view represented in Fig. 1.

The tire as a whole comprises a relatively hard base portion 1, a relatively soft body and tread portion 2, and an inflatable core or center 3. The base portion 1 may be composed of a quite hard rubber compound; the body and tread portion 2 may be composed of a softer rubber compound, and the hollow core or center 3 may be composed of a still purer rubber compound.

In building the tire, I first place a layer of relatively hard rubber compound in a wheel rim 4. I then take a strip of rubber impregnated fabric 5 and pass it circumferentially around the rim 4, tucking its central portion down on to the first layer of the base 1 in the rim 4. I then put another layer of similar compound in the rim 4 and on top of the strip of fabric 5, after which I place another similar strip of fabric 6 around the rim 4 in the same manner as in the case of the strip 5. Another layer of the rubber compound is similarly placed and followed by a third strip of fabric 7.

I then build up the remainder of the base 1 of the tire with more hard rubber compound until it attains about the level of the inner edges of the wheel rim 4, as clearly shown in the drawings.

Thereupon I place a very thin layer of the softer rubber compound on top of the base portion 1 and lay upon it strips of rubber impregnated fabric 8, 9, which have their lower edges lapped over each other, as clearly shown in Fig. 1.

After the tire has been thus far completed, I place a so-called air bag or inner tube, which forms the hollow core or center 3, in position circumferentially upon the portion of the tire so far built in the rim 4. This center 3 is provided with an air valve 10, the stem of which is forced through a small hole made in the portion of the tire already built, and in the rim 4, so as to extend inwardly within the rim for permitting the inflation of the hollow core 3, when desired. This air tube may conveniently be reinforced by layers of fabric 11, as clearly shown in Fig. 1.

After this air tube has been located in the tire structure, it is inflated sufficiently to cause it to hold its circular form, and the building of the tire is continued by placing around this air tube 3, a considerable amount of rubber compound adapted for forming the body and tread portion 2 of the tire.

After a certain amount of this compound has been placed about the hollow core 3, the layers of fabric 8, 9, are formed up about this compound so as to occupy the position clearly shown in Fig. 1 of the drawings. More of the rubber compound is then placed outside of the layers of fabric 8, 9, and around the outer periphery of the hollow center 3, after which the outer edges of the fabric layer 7 are formed up about the tire thus far constructed and overlapped outside of the periphery of the center 3, as clearly shown in Fig. 1 of the drawings.

Then some more of the compound is placed about the previously formed tire structure and the edges of the fabric layer 6 are formed up in the same manner as the strip or layer 7. Similarly, additional compound is placed outside of the layer 6, and the fabric layer or strip 5 is likewise formed up with its edges overlapping in the body portion of the tire.

After the building has been carried thus far, some more rubber compound is placed outside the overlapped edges of the layer 5, a breaker strip 12, likewise composed of rubber impregnated fabric, is placed in position and the remaining portion of the rubber compound constituting the tread proper, is formed on, thereupon completing the building up of the tire.

After the tire has been thus constructed, it and its rim 4, are placed in a mold adapted for the open-cure single cure wrapped tread process of vulcanization. This mold comprises annular mold sections or pressure rings 13, 14, which have their inner faces adapted to conform to the outline of the wheel rim 4, and to form substantially the inner half of the tire. These mold sections 13, 14, are fitted to abut against a central ring 15, which ring 15 is provided with a hole therethrough for permitting the valve 10 to protrude without the mold when the tire is in position thereon; and the said mold sections 13, 14, are adapted to be held in molding position by a bolt 16, or other convenient means. After the tire has been placed in position in this mold and the parts are held in molding position by the bolt 16, the whole is wrapped spirally and in an annular course by a wrapping of tape 17, in the manner well known in connection with the curing of tires by the so-called one cure wrapped tread process.

After the wrapping has been applied, the inner tube or hollow center 3 may be inflated to a very considerable pressure through the valve 10, thereby forcing the tire structure into a compact and well bonded unit.

While the tire is in this condition, it may be vulcanized or cured in suitable apparatus, in a manner well known in the art.

The rim 4 may, if desired, be provided with a circumferential series of lugs 18, for positively preventing any peripheral creeping of the tire on the said rim.

After the tire has been vulcanized, it and its rim 4 may be removed from the mold, and it will be found that the tire firmly adheres to the rim, in which condition it is adapted to be applied as a whole to the felly of a vehicle wheel and used as desired. It will be understood that in use, the hollow center or inner tube 3 may be inflated to any desired pressure, the structure thereby giving the advantages of both a so-called cushion tire and a pneumatic tire. Furthermore, it will be observed that the overlapping of the edges of the fabric layers 5, 6 and 7, provides extra strength and puncture-resisting qualities in the tread portion of the tire.

I desire it to be understood that I do not intend to limit myself to any particular composition of rubber, or to any particular character or number of plies of fabric, or to any particular collocation of the various rubber compounds and plies of fabric, or to any particular structure of the inner tube or hollow center, or to any particular construction of the mold or particular means for holding the parts of the mold in molding position, or to any other features of the invention, except as they may be specifically recited in the claim, as it is obvious that various changes may be resorted to in the form, construction and arrangement of the several parts without departing from the spirit and scope of my invention.

What I claim is:

A closed bellied tire having a base extending from one clencher edge of the tire to the other, the said tire comprising rubber compound and fabric, the compound used in the base portion being relatively hard and the compound in the tread portion being relatively soft, the plies of fabric being embedded in the hard compound of the base and having their edges overlapping in the soft compound of the tread.

In testimony, that I claim the foregoing as my invention, I have signed my name in presence of two witnesses, this sixth day of June 1912.

PETER D. THROPP.

Witnesses:
CLIFFORD W. LEE,
HARRY P. MESSLER.